Figure 1:
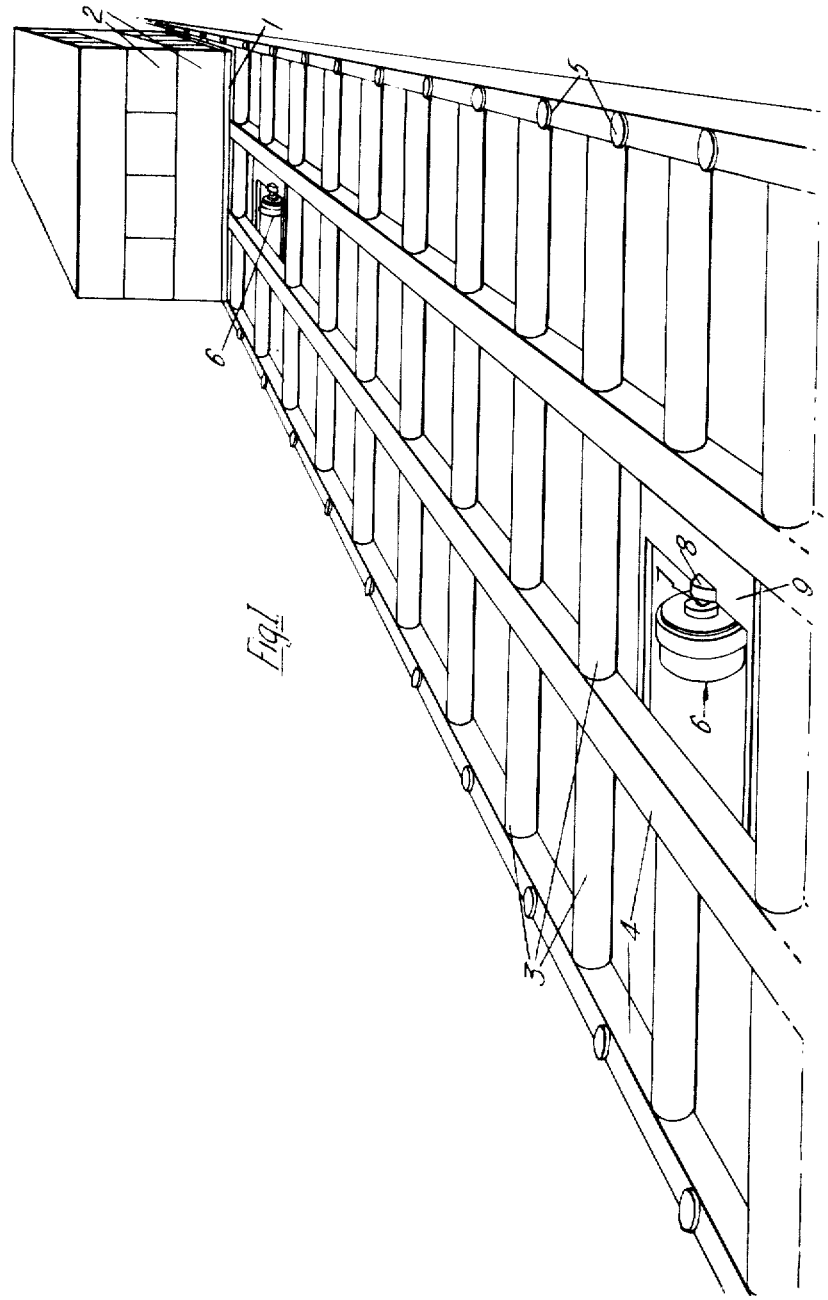

April 12, 1966  H. COWAN  3,245,510
BRAKING ROLLER OR WHEEL
Filed Oct. 22, 1964  3 Sheets-Sheet 1

INVENTOR
HENRY COWAN
BY
Holcombe, Wetherill & Brisebois
ATTORNEYS

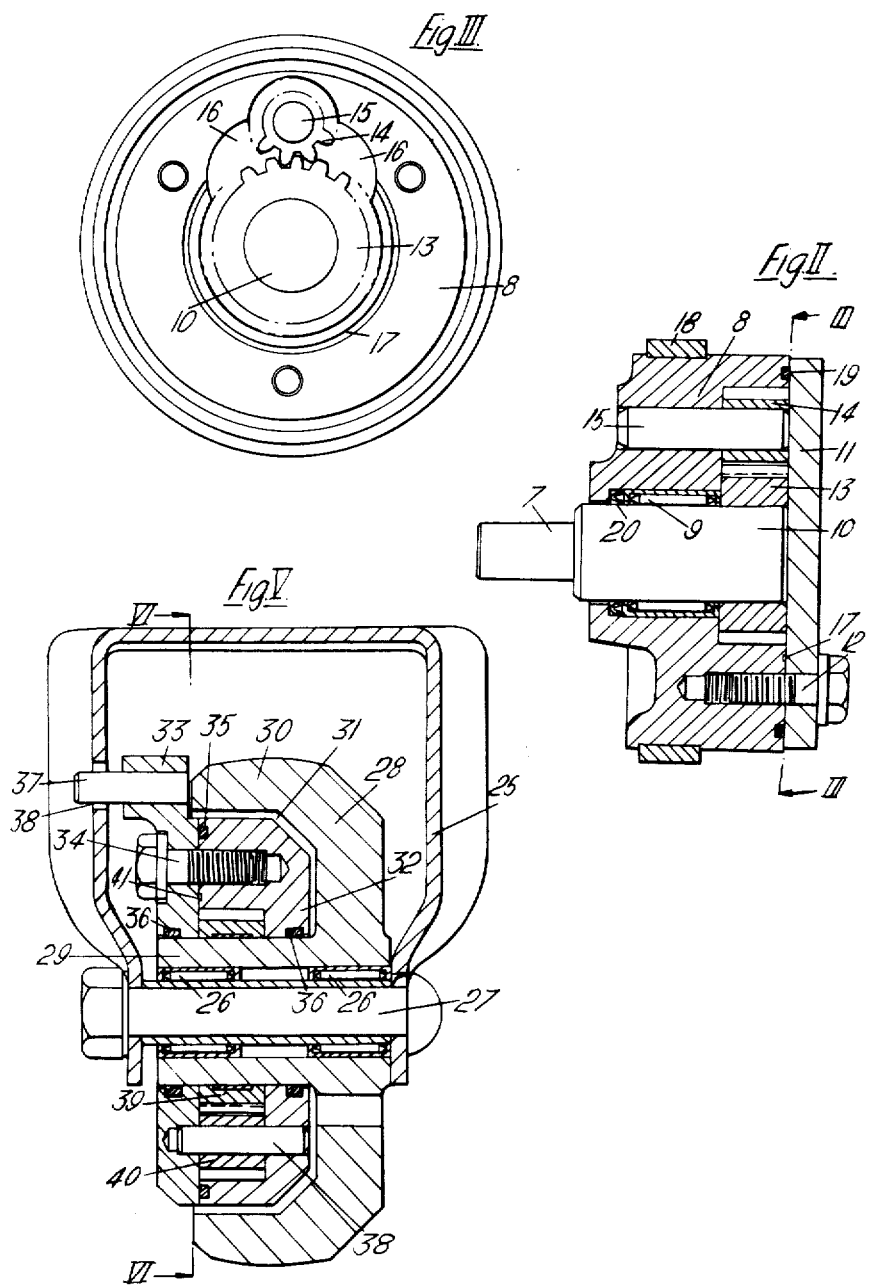

April 12, 1966      H. COWAN      3,245,510
BRAKING ROLLER OR WHEEL
Filed Oct. 22, 1964      3 Sheets-Sheet 3
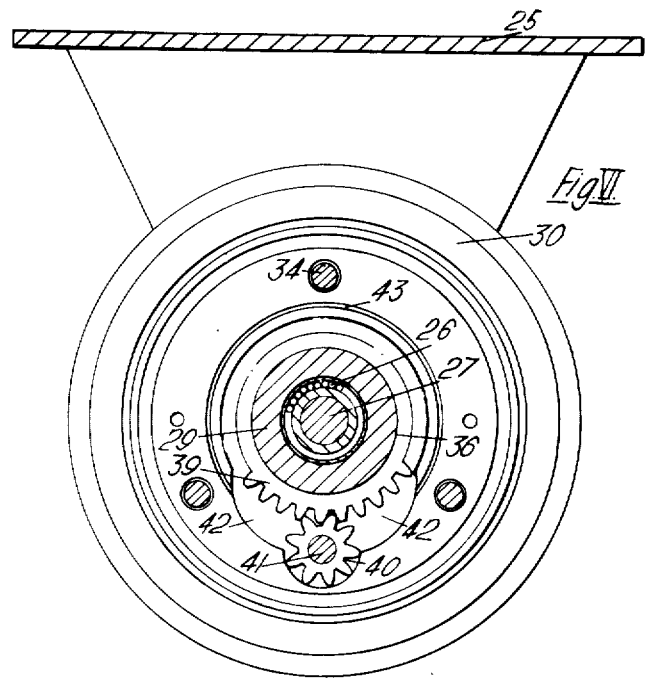
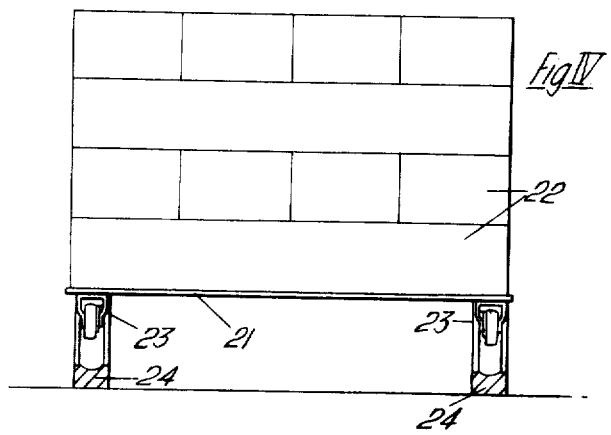
INVENTOR
HENRY COWAN
BY
Holcombe, Wetherill + Brisebois
ATTORNEYS

United States Patent Office 3,245,510
Patented Apr. 12, 1966

3,245,510
BRAKING ROLLER OR WHEEL
Henry Cowan, Lillington, Leamington Spa, England, assignor to Iso-Speedic Company Limited, Warwick, England, a British company
Filed Oct. 22, 1964, Ser. No. 405,774
Claims priority, application Great Britain, Oct. 31, 1963, 43,072/63
4 Claims. (Cl. 193—35)

In one kind of mechanical goods handling system, a carrier such as a pallet or truck runs under gravity down an inclined path along which it is guided. The guidance may be provided by wheels on the carrier running on guide rails or the carrier may run over and be transversely located with respect to a series of rollers which rotate about fixed axes. One problem with such systems is that it is desirable for the carriers to accelerate reasonably quickly to a terminal velocity which is not exceeded however long the path may be so that the carrier can be stopped safely and automatically at an unloading point. Some form of braking for the wheels or rollers, the rotational speeds of which are proportional to the linear speed of the carrier, is therefore required which produces little resistance to motion at low speeds so that the carrier will accelerate freely when starting but which produces a greater resistance with increasing speed until the component of gravitational force down the inclined path is just balanced.

Centrifugally operated brakes have been used in analagous transportation systems but we find that these are not suitable for producing a low terminal velocity and are difficult to include in a compact wheel or roller mounting.

In accordance with the present invention a wheel or roller for supporting a carrier of a system of the kind described carries one gear wheel of a gear pump which pumps hydraulic fluid around a closed circuit as the wheel or roller rotates.

With this particularly compact and simple arrangement, little resistance to rotation of the wheel or roller is provided at low rotational speeds but as the speed of the carrier increases, the resistance increases accordingly. The closed circuit may be provided with a variable restriction for determining the resistance at any given speed. Alternatively, and in some ways preferably, the resistance can be varied by changing the hydraulic fluid for one having a different viscosity. However, the fluid should be chosen so that its viscosity varies as little as possible with temperature in the temperature range likely to be experienced.

In one simple arrangement, the wheel or roller carries a first pinion meshing with a second pinion, both of which rotate with small clearances in a casing of the pump with two pump chambers formed in the casing one on each side of the mesh between the pinions, the two pump chambers being connected by a restricting passage which is formed in the casing and extends around the axis of rotation of the wheel or roller. For example, the wheel or roller may be rotatably mounted on a non-rotatable axle and itself form the pump casing, the two pinions being provided one by a sun wheel fixed on the axle and the other by a planet wheel rotatably carried by the wheel or roller.

Two examples of goods handling systems of the kind described and including wheels or roller constructed in accordance with the present invention are illustrated in the accompanying drawings in which:

FIGURE I is a perspective view of one system;
FIGURE II is a central axial section through one of the rollers of the system;
FIGURE III is an end elevation of the roller shown in FIGURE II with an end cover plate of the roller removed, as seen in the direction of the arrows III—III in FIGURE II,
FIGURE IV is a front elevation of the second system;
FIGURE V is a central axial section through a wheel of the second system; and
FIGURE VI is a section taken on the line VI—VI in FIGURE V.

The first system illustrated in FIGURES I to III comprises one or more flat rectangular plywood pallets 1 on which boxes or crates 2 can be stacked and which run down an inclined track over three rows of rollers 3. The rollers 3 are freely rotatable about fixed horizontal axes and are mounted between adjacent pairs of beams 4 of a supporting framework. Lateral guide rollers 5 are mounted at intervals along the outer beams 4 and are freely rotatable about fixed vertical axes. The rollers 5 are positioned so that they engage the sides of a pallet 1 and prevent the pallet from being displaced laterally on the track.

At intervals corresponding to two pallet lengths, a roller 3 of the central row of rollers is replaced by a special brake roller 6. The brake roller 6 is rotatable on an axle 7 which is rigidly and non-rotatably supported in a bracket 8 carried by a part 9 of the framework.

As shown in FIGURES II and III, the roller 6 has a body 8 which is rotatably mounted by means of a needle bearing 9 on a hub 10 formed integrally with the axle 7. One end face of the roller consists of a removable cover plate 11 which is bolted to the body 8 by three bolts 12 and which, together with the body 8 forms the casing for a gear pump mounted in hollowed portion of the body 8. The gear pump comprises a sun wheel 13 rigidly fixed on the hub 10 and a planet wheel which meshes with the sun wheel 13 and which is freely rotatable on a pin 15 which is a tight leakproof fit in a bore on the body 8. The pinions 13 and 14 run with small axial and radial clearances adjacent the inner wall of the hollowed portion of the body 8, but each side of the mesh of the pinions the hollowed portion is enlarged to form two pump chambers 16 which are interconnected by a narrow passage 17 extending in the body 8 around the pinion 13 and formed between a groove in the body 8 and the cover plate 11. The chambers 16 and passage 17 are filled with oil except perhaps for a small air bubble to allow for expansion of the oil.

The body 8 is surrounded by a solid rubber tyre 18 which stands a little proud of the other rollers 3 in the centre row of rollers. The arrangement is such that as the pallet 1 runs down the track, its underneath frictionally engages the rubber tyre 18 of each roller 6 in turn and causes the roller to rotate. As the roller rotates irrespective of direction, the body 8 carries the planet wheel 14 around with it and the stationary sun wheel 13 causes the planet wheel 14 to rotate and pump oil from one chamber 16 to the other and hence back to the first chamber through the restricted passageway 17. The passageway 17 throttles the flow of oil and provides a resistance to the pumping action of the gear pump so that the roller 6 is braked. The resistance is small at low rotational speeds but increases as the speed of rotation increases so that for a given weight of pallet and load, a given inclination of track, and a given viscosity of oil, the roller 6 will accelerate to a terminal velocity which will not be exceeded. As the pallet 1 runs down the track, it will accelerate freely while not in contact with a roller 6 but will be stabilised at a terminal velocity as it engages and runs over each roller 6 in turn.

The gear pump is accessible for servicing or for replacement of the oil by one having a different viscosity, by undoing and removing the bolts 12 and removing the cover plate 11. The oil is securely retained within the gear pump and passageway 7 by a static O-sealing ring 19 between the cover plate 11 and the body 8 and by a sealing ring 20 of a channel section positioned between the relatively rotating hub 10 and body 8 with the open face of the ring towards the oil pressure in the gear pump. The oil in the pump lubricates the needle bearing 9.

In the second system illustrated in FIGURES IV, V and VI, one or more flat plywood goods pallets 21 on which goods 22 may be stacked, is supported at its corners by wheels 23 which run in grooved rails 24 of an inclined track. As shown in FIGURE V and VI, each wheel is supported by means of a U-shaped bracket 25 and two needle roller bearings 26 share a common inner race mounted on a bolt 27 which extends between the two arms of the brackets 25. Each wheel has a body 28 formed with an integral hollow stub axle 29 which is mounted on the bearings 26. An outer flange 30 of the wheel is chamfered so that it fits into and is laterally guided in one of the grooved rails 24. An annular cavity 31 is formed between the stub axle 29 and the flange 30.

A gear pump having a casing by a body 32 and an end cover 33 which is bolted by three bolts 34 to the body 32 with an O-sealing ring 35 between them is mounted within the annular cavity around the stub axle 29 to which it is sealed by O-sealing rings 36. The pump casing is prevented from rotating with the wheel by means of a pin 37 which projects from the casing and engages in a hole 38 in one of the arms of the supporting bracket 25. A sun wheel 39 is fixed on the stub axle 29 so that it rotates with the wheel within the pump casing and a planet wheel 40 which meshes with the sun wheel 39 is freely rotatable on a pin 41 which is a push fit at one end in a blind bore in the end plate 33 and a tight leak-proof fit at its other end in an open bore in the body 32. Two pump chambers 42 are formed in the casing one on each side of the mesh between the sun wheel 39 and a planet wheel 40 and are connected by a restricted passageway 43 formed between the groove in the body 32 and the end plate 33 and extending around the sun wheel 39. The pump chambers 42 and the restricted passageway 43 are filled with oil as also are all other spaces within the pump. A small air bubble may also be introduced into the pump chambers to provide some freedom for the oil to expand owing to temperature fluctuations. Both the gear wheels 39 and 40 have very small radial and axial clearances in the casing and, when the wheel rotates as the pallet 21 moves under gravity down the inclined track, irrespective of the direction of rotation of the wheel, the gear pump pumps oil from one chamber 42 to the other and from there around the restricted passageway 42 to the first chamber again. As with the first system, this provides a small resistance to motion at low rotational speeds and the resistance increases with increasing speed until the pallet reaches a relatively low terminal velocity which will remain constant because the wheels 23 rotate all the time as the pallet moves.

It is not of course necessary for all the four wheels of the pallet 21 to be provided with a gear pump for braking purposes and any one of the wheels can be converted to a simple free running wheel by removing the body 28 of the wheel from its supporting bracket 25, sliding the pump together with the sun wheel 39 off the stub axle 29 and resecuring the body of the wheel 28 in its bracket 25 again.

I claim:

1. In a mechanical goods handling system of the kind comprising an inclined track, a goods carrier adapted to move under gravity down said track, and means supporting said goods carrier during said movement; the improved support means which comprises a rotary member rotatably carried by one and peripherally engaging the other of said carrier and said track, said rotary member comprising a recessed portion which turns therewith, means defining with said recessed portion a closed chamber, first and second meshing gear wheels within said chamber which form with said chamber a gear pump, said first gear wheel being carried on a fixed axis and said second gear wheel being carried by said rotary member and mounted to rotate when said rotary member rotates whereby said pump is driven and a mass of hydraulic fluid substantially filling said pump chamber for continuous circulation by said pump whereby the resistance of said fluid to the action of said pump provides a braking effect.

2. Apparatus as claimed in claim 1 which comprises a restricted passageway encircling the axis of said rotary member and connecting portions of said chamber lying on opposite sides of the point at which said gear wheels mesh.

3. Apparatus as claimed in claim 1 in which said rotary member is a roller rotatably mounted on said goods carrier and engaging said track.

4. Apparatus as claimed in claim 1 in which said rotary member is a roller rotatably mounted on said track and positioned to frictionally engage said goods carrier as it passes along said track.

References Cited by the Examiner

UNITED STATES PATENTS

| 152,718 | 6/1874 | Wyman. | |
|---|---|---|---|
| 1,626,542 | 4/1927 | Larson | 188—92 |
| 1,632,425 | 6/1927 | Yeary | 188—92 |
| 1,683,665 | 9/1928 | Griffith | 188—92 |
| 2,070,614 | 2/1937 | Melville | 188—92 |
| 2,087,638 | 7/1937 | Clark et al. | 188—92 |
| 2,101,053 | 12/1937 | Della Santina et al. | |
| 2,845,149 | 7/1958 | Stern et al. | 188—92 X |
| 3,095,956 | 7/1963 | McGill | 193—35 |
| 3,180,472 | 4/1965 | Isacsson | 193—37 |

EVON C. BLUNK, *Primary Examiner.*

SAMUEL F. COLEMAN, *Examiner.*

A. L. LEVINE, *Assistant Examiner.*